(12) United States Patent
Kotab

(10) Patent No.: US 10,499,187 B2
(45) Date of Patent: *Dec. 3, 2019

(54) METHODS FOR DETERMINING AND DISPLAYING A LOCAL PAGE FOR A MOBILE DEVICE AND SYSTEMS THEREOF

(71) Applicant: Dominic M. Kotab, San Jose, CA (US)

(72) Inventor: Dominic M. Kotab, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/115,473

(22) Filed: Aug. 28, 2018

(65) Prior Publication Data

US 2019/0020974 A1    Jan. 17, 2019

Related U.S. Application Data

(63) Continuation of application No. 15/913,643, filed on Mar. 6, 2018, now Pat. No. 10,091,613, which is a continuation of application No. 14/828,436, filed on Aug. 17, 2015, now Pat. No. 9,930,484, which is a continuation of application No. 12/625,448, filed on Nov. 24, 2009, now Pat. No. 9,113,342.

(60) Provisional application No. 61/117,890, filed on Nov. 25, 2008.

(51) Int. Cl.
*H04W 4/021* (2018.01)
*H04W 24/00* (2009.01)
*H04W 4/029* (2018.01)

(52) U.S. Cl.
CPC ........... *H04W 4/021* (2013.01); *H04W 4/029* (2018.02); *H04W 24/00* (2013.01)

(58) Field of Classification Search
CPC ......... H04L 29/08108; H04L 29/08657; H04L 29/08936; H04W 4/02; H04W 64/00
See application file for complete search history.

(56) References Cited

U.S. PATENT DOCUMENTS

| | | | | |
|---|---|---|---|---|
| 6,169,897 | B1* | 1/2001 | Kariya | H04M 1/72561 455/456.3 |
| 6,236,365 | B1* | 5/2001 | LeBlanc | G01C 21/206 342/457 |
| 6,505,046 | B1* | 1/2003 | Baker | G06Q 30/02 455/456.3 |
| 6,611,687 | B1* | 8/2003 | Clark | H04W 4/029 455/456.5 |
| 2009/0316671 | A1* | 12/2009 | Rolf | H04W 4/029 370/338 |

* cited by examiner

*Primary Examiner* — Sharad Rampuria
(74) *Attorney, Agent, or Firm* — Zilka-Kotab, PC

(57) ABSTRACT

A mobile device-implemented method, according to one embodiment, includes receiving, at a mobile device, preference information from a user, receiving a request from the user for output of a predetermined page, including identifying a selection, by the user, of the predetermined page to be displayed by the mobile device, in response to the identifying of the selection, retrieving content via a wireless connection based on the preference information, the content including one or more news articles selected by a content provider based on the preference information, automatically designing a layout of one or more objects associated with the retrieved content for display on the mobile device, and including the content retrieved in the predetermined page displayed by the mobile device, including outputting the retrieved content on the predetermined page of the mobile device.

20 Claims, 3 Drawing Sheets

METHODS FOR DETERMINING AND DISPLAYING A LOCAL PAGE FOR A MOBILE DEVICE AND SYSTEMS THEREOF

RELATED APPLICATIONS

This application is a continuation of U.S. patent application Ser. No. 15/913,643, filed Mar. 6, 2018, which claims priority to U.S. patent application Ser. No. 14/828,436, filed Aug. 17, 2015, now U.S. Pat. No. 9,930,484, which in turn claims priority to U.S. patent application Ser. No. 12/625,448, filed Nov. 24, 2009, now U.S. Pat. No. 9,113,342, and U.S. Provisional Patent Appl. No. 61/117,890, filed Nov. 25, 2008, which are herein incorporated by reference.

FIELD OF THE INVENTION

The present invention relates to retrieving and displaying content on a mobile device, and more particularly to retrieving and displaying current content on a mobile device depending on where the mobile device is located.

SUMMARY

A mobile device-implemented method, according to one embodiment, includes receiving, at a mobile device, preference information from a user, receiving a request from the user for output of a predetermined page, including identifying a selection, by the user, of the predetermined page to be displayed by the mobile device, in response to the identifying of the selection, retrieving content via a wireless connection based on the preference information, the content including one or more news articles selected by a content provider based on the preference information, automatically designing a layout of one or more objects associated with the retrieved content for display on the mobile device, and including the content retrieved in the predetermined page displayed by the mobile device, including outputting the retrieved content on the predetermined page of the mobile device.

In another embodiment, a computer program product includes a computer usable medium having computer usable program code embodied therewith, the computer usable program code including computer usable program code configured to receive, at a mobile device, preference information from a user, receive a request from the user for output of a predetermined page, including identifying a selection, by the user, of the predetermined page to be displayed by the mobile device, in response to the identifying of the selection, retrieve content via a wireless connection based on the preference information, the content including one or more news articles selected by a content provider based on the preference information, automatically design a layout of one or more objects associated with the retrieved content for display on the mobile device, and include the content retrieved in the predetermined page displayed by the mobile device, including outputting the retrieved content on the predetermined page of the mobile device.

According to another embodiment, a system includes a processor, and a computer usable medium, the computer usable medium having computer usable program code embodied therewith, which when executed by the processor causes the processor to receive, at a mobile device, preference information from a user, receive a request from the user for output of a predetermined page, including identifying a selection, by the user, of the predetermined page to be displayed by the mobile device, in response to the identifying of the selection, retrieve content via a wireless connection based on the preference information, the content including one or more news articles selected by a content provider based on the preference information, automatically design a layout of one or more objects associated with the retrieved content for display on the mobile device, and include the content retrieved in the predetermined page displayed by the mobile device, including outputting the retrieved content on the predetermined page of the mobile device.

BRIEF DESCRIPTION OF THE DRAWINGS

For a fuller understanding of the nature and advantages of the present invention, as well as illustrative modes of use, reference should be made to the following detailed description read in conjunction with the accompanying drawings.

Various embodiments of the present invention are described in further detail below with reference to the figures, in which like items are numbered the same in the several figures.

DETAILED DESCRIPTION

The following paragraphs describe certain features and combinations of features that can be used in connection with each of the methods of the invention and embodiments, as generally described below. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation and scope including one or more meanings implied from the specification as well as one or more meanings understood by those skilled in the art and/or as defined in dictionaries, treatises, etc.

The following description is made for the purpose of illustrating the general principles of the present invention and is not meant to limit the inventive concepts claimed herein. Further, particular features described herein can be used in combination with other described features in each of the various possible combinations and permutations.

It must also be noted that, as used in the specification and the appended claims, the singular forms "a," "an" and "the" include plural referents unless otherwise specified.

Figure 1:
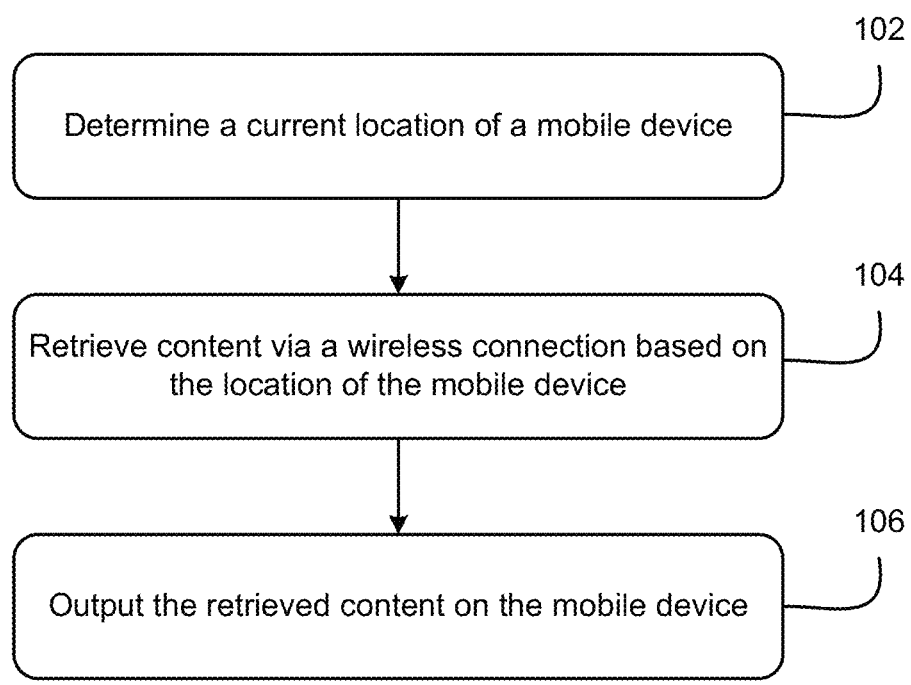
FIG. 1 shows a method according to one embodiment.

According to one general embodiment, a method includes determining a current location of a mobile device (as shown in FIG. 1, operation 102); retrieving content via a wireless connection based on the location of the mobile device (as shown in FIG. 1, operation 104); and outputting the retrieved content on the mobile device (as shown in FIG. 1, operation 106).

Figure 2:
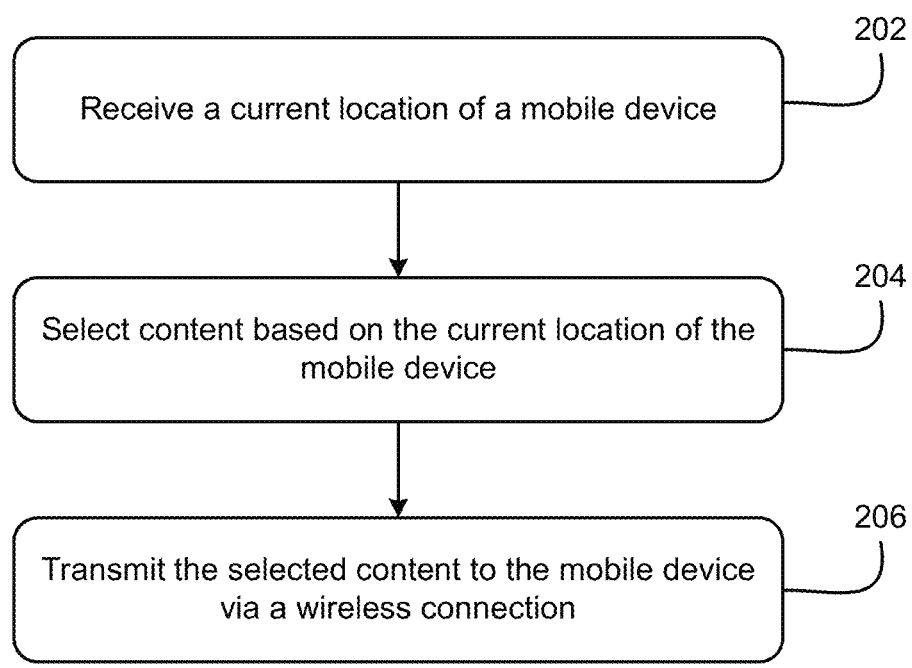
FIG. 2 shows a method according to one embodiment.

In another general embodiment, a method includes receiving a current location of a mobile device (as shown in FIG. 2, operation 202); selecting content based on the current location of the mobile device (as shown in FIG. 2, operation 204); and transmitting the selected content to the mobile device via a wireless connection (as shown in FIG. 2, operation 206).

In another general embodiment, a system includes a processor; and a computer usable medium, the computer usable medium having computer usable program code embodied therewith, which when executed by the processor causes the processor to: determine a location of a mobile device; retrieve content via a wireless connection based on the location of the mobile device; and output the retrieved content on the mobile device.

In another general embodiment, a system includes a processor; and a computer usable medium, the computer usable medium having computer usable program code embodied therewith, which when executed by the processor causes the processor to: receive a current location of a mobile device; select content based on the current location of the mobile device; and transmit the selected content to the mobile device via a wireless connection.

In yet another general embodiment a computer program product for displaying local content comprises: a computer usable medium having computer usable program code embodied therewith, the computer usable program code comprising: computer usable program code configured to determine a location of a mobile device; computer usable program code configured to retrieve content via a wireless connection based on the location of the mobile device; and computer usable program code configured to output the retrieved content on the mobile device.

In yet another general embodiment a computer program product for displaying local content comprises: a computer usable medium having computer usable program code embodied therewith, the computer usable program code comprising: computer usable program code configured to receive a current location of a mobile device; computer usable program code configured to select content based on the current location of the mobile device; and computer usable program code configured to transmit the selected content to the mobile device via a wireless connection.

In yet another general embodiment a system comprises: logic for determining a location of a mobile device; logic for retrieving content via a wireless connection based on the location of the mobile device; and logic for outputting the retrieved content on the mobile device.

In yet another general embodiment a system comprises: logic for receiving a current location of a mobile device; logic for selecting content based on the current location of the mobile device; and logic for transmitting the selected content to the mobile device via a wireless connection.

Figure 3:
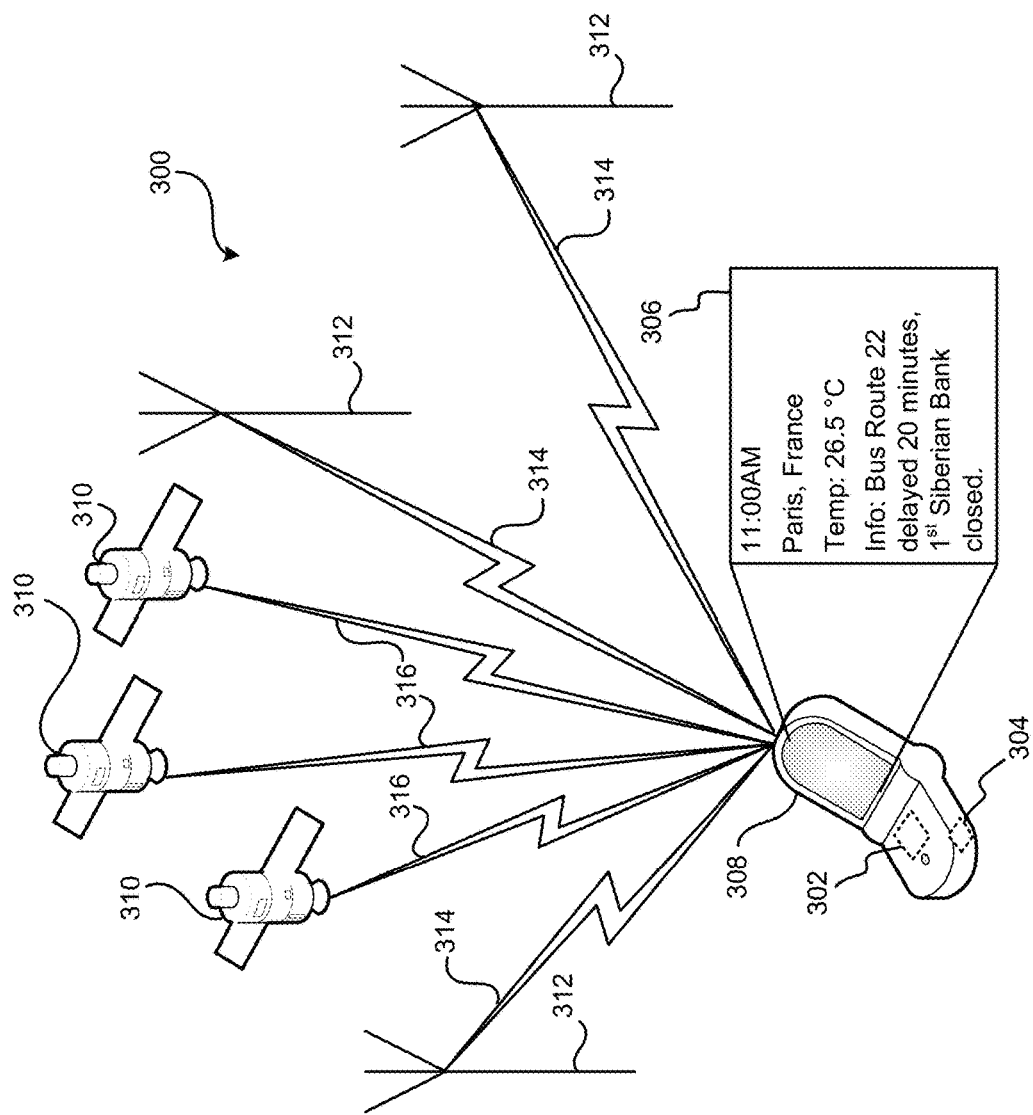
FIG. 3 shows a simple schematic diagram of a system, according to one embodiment.

With reference to FIG. 3, in some preferred embodiments, current content 306 may be retrieved and displayed on a mobile device 308. FIG. 3 is a schematic diagram of a system 300 according to one embodiment. In some approaches, the mobile device 308 may be a mobile telephone (such as an APPLE iPHONE, T-MOBILE G1, MOTOROLA V9, VERIZON DROID, etc.), a BLACK-BERRY device, a mobile Global Positioning System (GPS) device (such as a navigation system in an automobile, handheld GPS device, etc.), etc. In further embodiments, the mobile device 308 may have global positioning satellite functionality, i.e., the mobile device may be able to calculate its coordinates (and hence determine its location) based on GPS information received through a GPS system. In still other embodiments, the mobile device 308 may not have GPS functionality, but may be able to determine its position based on the proximity of mobile communications towers 312.

In some embodiments, certain content 306 may be selected to be displayed on the mobile device 308. This content may be automatically selected by the mobile device 308 or by another system, such as a service which provides the content 306 to the mobile device 308, a program running on the mobile device 308, a website which the mobile device 308 accesses to retrieve some or all of the content 306, etc. Moreover, selection of the content may be made based on the approximate or actual geographic location of the mobile device 308. Preferably, the content is requested and/or selected based at least in part on location information about the mobile device that is more accurate than geographic information derived from a proximity to mobile communication towers. In one particularly preferred approach, the content is requested and/or selected based at least in part on a GPS-based location of the mobile device. Accordingly, in one approach, a request for information sent from the mobile device 308 to a content provider may include coordinates or other positioning information derived on the mobile device from GPS data. An illustrative series of operations on the mobile device, in no particular order, may include receiving a request from a user for content such as a home page; the mobile device ascertains its location using GPS data; information about the location is sent with a request for content to a service or content provider; and content relating to the location is received by the mobile device and output thereby. In one approach, the mobile device may simply receive a user request for the user's normal home page, but will actually receive (from a content provider) information pertinent to the present location of the device, with or without other information that the user would normally receive when at his or her "home" area or location. Thus, for example, when the user is in his or her "home" area or location, the home page received by the device may include information according to preferences set by the user and/or pertaining to the user's home area or location. When the user is in some other location, the home page received by the device may include information pertaining to the present location of the mobile device, without the user specifically requesting such information when requesting the home page.

In one approach, a user may select or preselect which content to display on a local page, which may be displayed on the mobile device 308, e.g., upon the device sending a request for a local page. The user may select the content 306 from a predefined group of content, including type or class of content, which the device may access, and/or the user may search for content, which the mobile device 308 may then update upon request. The user selected content 306 may be updated each time the mobile device 308 retrieves content.

In preferred embodiments, the mobile device 308 may determine a current location of the mobile device 308. Any method and/or system capable of determining the current location of the mobile device may be used, including GPS, communication tower 312 proximities, etc. For example, the mobile device may use the GPS capability to determine its current coordinates, to a reasonable accuracy, such as within or less than 10 square miles from the estimated or actual location of the device, 1 square mile, 100 square yards, 10 square yards, within or less than a radius of 10 miles, within a radius of 1 mile, within a radius of 100 yards, within a radius of 10 yards, at the estimated or actual location itself (e.g., within the range of accuracy of the measurement), etc. or more or less relative to the position of the device. The accuracy to which the mobile device should determine its present location may depend upon other factors, such as the content to be retrieved, the general location, the amount of attractions within close proximity, etc., though a default accuracy or area may suffice for many applications.

In one approach, the mobile device 308 may use signals from GPS satellites 310 in order to approximate its position. In another approach, the mobile device 308 may use mobile communications towers 312 with which to approximate its location, such as through triangulation, last tower pinged, etc.

In some approaches, an event may trigger the mobile device 308 to determine its current location. An event may include a passage of a predetermined period of time, such as 10 min., 30 min., 60 min., etc. or more or less. Of course, a periodic check may be performed after more or less time, and factors may be taken into account when setting the preset time period, such as the power used each time the mobile device 308 determines its present location (in addition to the battery life of the mobile device 308), the time of day in the local region (i.e., less or no location checks may be needed between the hours of 12:00 AM and 6:00 AM local time, etc.), user tendencies, etc. In some embodiments, a user may select the time period between periodic location checks of the mobile device 308, possibly through an interface with the mobile device 308, a website, a system providing content to the mobile device 308, etc.

In another approach, an event that may trigger the mobile device 308 to determine its current location may include an input from a user, such as a user request to update content, search for new content, view content having some geographic relationship to the proximity to the current position of the mobile device 308, etc. Such content may include local weather, airport delays, traffic reports or status, nearby places such as restaurants and other businesses, nearby people, etc. The content 306 may be output on a browser of the mobile device 308, a display of the mobile device 308, a homepage of the mobile device 308, etc.

In another approach, a trigger may include moving the mobile device 308 from the service area of one communications tower 312 to the service area of another communications tower 312 (switching of mobile communication towers). For example, if the mobile device 308 is a mobile telephone, when a user moves the mobile telephone from one city to another, the mobile telephone will search for a new communications tower 312 from which it can receive and transmit data. When the mobile telephone switches communications towers 312, it may also determine the present location of the mobile device 308, thereby keeping the present location current with movements of the mobile telephone.

In some preferred embodiments, the mobile device 308 may determine the present location through a GPS system, while retrieving content through a different system, such as a wireless mobile telephone system. For example, if the mobile device 308 is a 3G mobile telephone equipped with GPS, the present location may be determined through GPS functionality, while content may be retrieved through the 3G wireless network.

In some additional embodiments, the location of the mobile device 308 may be determined by calculating a position based on global positioning satellite 310 information. In other embodiments, the location may be determined through triangulation or some other method of determining position based on proximity to mobile communication towers. In some embodiments, GPS information may be used when available, and if it is not available, the mobile device 308 or some other system may rely on determining position based on proximity to mobile communication towers 312. In some approaches, the current location may be transmitted to another system or entity, such as a content provider, a communications provider, an internet application, etc.

In some further embodiments, the mobile device 308 may be equipped with a component, wherein the coordinates of the current location of the component may be determined through a satellite-based GPS. In these approaches, the mobile device 308 may or may not have the component included internally, and the component may or may not be provided with the mobile device 308 during an initial purchase transaction. For example, the component may be an add-on feature which may be purchased from a service provider, content provider, etc., after the mobile device 308 has already been purchased and provided to a user.

In some embodiments, the outputting the retrieved content 306 on the mobile device 308 may comprise displaying the retrieved content 306 on the mobile device 308. In addition, in some embodiments, the content 306 may be displayed on the mobile device 308 according to a certain layout. The layout may be designed by a user, by a system providing content to the mobile device, by a website, etc. In another approach, the mobile device 308, system providing content to the mobile device 308, website, etc., may automatically design the layout of the content based on factors, such as user preferences, number of times content item has been selected, location of the mobile device 308, etc. For example, if a user frequently checks the weather when arriving at a new location, the mobile device 308 may display the current weather at the top of the layout of a local page for the new location that the mobile device 308 is located. In other embodiments, the usual home page may have a link to the local content, such as a "local content" link, "local restaurants" link, "local weather" link, or other link. The mobile device 308 may detect selection of the "local" link, which initiates retrieval of the local content 306 based on the location of the mobile device 308.

In further embodiments, the mobile device 308 and/or content provider may allow the user to set a preference that causes the mobile device 308 to receive local information based on the present location of the mobile device 308 automatically or by default. For example, a preference may be set, under direction of the user, that causes all or a portion of the usual browser home page to output local information based on the present location of the mobile device 308. For example, assume a user is about to fly from San Jose, Calif. to New York. While the user is in San Jose, the home page may output weather information and airport delay information for San Jose. When the user arrives in New York, the home page may instead, or in addition, output weather information and airport delay information for New York.

Moreover, whether and/or how the location-related information is output may be stored on the mobile device 308 and/or by a provider. For example, using the San Jose to New York scenario, after landing in New York, the mobile device 308 may send information to the provider indicating that local information is desired, upon which the provider may send content relating to New York (or portion thereof) to the mobile device 308. The information sent by the mobile device 308 may include the location of the mobile device. In another approach, the information sent by the mobile device 308 may include an indication for the provider to ascertain the location of the mobile device 308, e.g., by determining which tower the mobile device 308 is communicating with.

In another example, the user's preference is saved by the provider or other entity. Upon receiving a request for content such as a home page from the mobile device 308, the receiving system may determine the user's preference, and automatically send back content relating to New York (or portion thereof) to the mobile device 308. Preferably, the content is selected and/or output in the format and/or layout typically used in the user's home page, e.g., including providing content by type or category (e.g., news, weather, etc.).

In some preferred embodiments, the content comprises at least one of current weather, current time, airline information, local news, local restaurants, etc. This content is preferably provided for locations within a predetermined distance of the present location of the mobile device 308, e.g., 10 miles, 5 miles, 1 mile, 0.5 miles, 0.25 miles, etc.

In some preferred embodiments, the content may be displayed on a local page (which may be a distinct page, a variation of the user's home page or portion thereof, etc.) on the mobile device 308, where the local page may comprise a navigable screen. For example, the local page may resemble a webpage, where the user may navigate to and from content through interface with on screen items like hyper text links, radio buttons, etc. In additional embodiments, the local page may resemble a selectable setting, such as a work desk, home, kitchen, car, etc., where content may be navigated through selection of one or more objects displayed on the local page. Any other display method may also be used to represent the local page to the user.

In some approaches, the content to output to the mobile device 308 may be specified. In some further approaches, a content provider and/or a communications provider and/or an internet application may specify the content to output to the mobile device 308. For example, a content provider may include GOOGLE, which could provide current news. GOOGLE may select which current news articles are most relevant based on criteria provided, such as location, time, user preferences for types of news stories, etc. In another example, a communications provider may include a mobile telephone service provider, such as SPRINT or VERIZON, where the communications provider may select content to output to the mobile device 308, such as current time, temperature, etc., which may be based on other criteria, as discussed above.

In some additional approaches, a user may specify the content to be provided to the mobile device 308, such as by setting preferences on the local page, indicating preferences for certain type of information, or from consistently accessing particular applications, information, data, etc. For example, a preference for local weather, traffic, and restaurants may be set. Accordingly, these items are output, automatically or upon request, when the user accesses the browser.

The program environment in which a present embodiment of the invention may be executed illustratively incorporates one or more general-purpose computers or special-purpose devices. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, nonvolatile memory device, etc.

Additionally, some or all of the aforementioned code may be embodied on any computer readable storage media including tape, FLASH memory, system memory, hard drive, etc. Additionally, a data signal embodied in a carrier wave (e.g., in a network including the Internet) can be the computer readable storage medium.

In one embodiment, a system 300 includes a processor 302; a computer usable medium 304, the computer usable medium 304 having computer usable program code embodied therewith, which when executed by the processor causes the processor to perform certain tasks. In one embodiment, the tasks include determining a location of a mobile device 308, retrieving content 306 via a wireless connection 312, 314 based on the location of the mobile device 308, and outputting the retrieved content 306 on the mobile device 308.

In another embodiment, a computer usable medium, the computer usable medium having computer usable program code embodied therewith causes the processor 302 to receive a current location of a mobile device 308, select content 306 based on the current location of the mobile device 308, and transmit the selected content 306 to the mobile device 308 via a wireless connection 312, 314.

In more approaches, a system 300 includes logic for determining a location of a mobile device 308, logic for retrieving content 306 via a wireless connection (either of 312 and 314) based on the location of the mobile device 308, and logic for outputting the retrieved content 306 on the mobile device 308, such as on a display.

In more approaches, a system includes logic for receiving a current location of a mobile device 308, logic for selecting content 306 based on the current location of the mobile device 308, and logic for transmitting the selected content 306 to the mobile device 308 via a wireless connection 312, 314.

While various embodiments have been described above, it should be understood that they have been presented by way of example only, and not limitation. Thus, the breadth and scope of an embodiment should not be limited by any of the above-described exemplary embodiments, but should be defined only in accordance with the following claims and their equivalents.

What is claimed is:

1. A mobile device-implemented method, comprising:
   receiving, at a mobile device, preference information from a user;
   receiving a request from the user for output of a predetermined page, including identifying a selection, by the user, of the predetermined page to be displayed by the mobile device;
   in response to the identifying of the selection, retrieving content via a wireless connection based on the preference information, the content including one or more news articles selected by a content provider based on the preference information;

automatically designing a layout of one or more objects associated with the retrieved content for display on the mobile device; and including the content retrieved in the predetermined page displayed by the mobile device, including outputting the retrieved content on the predetermined page of the mobile device.

2. The method of claim 1, wherein the mobile device is a mobile telephone.

3. The method of claim 1, wherein the content provider is GOOGLE.

4. The method of claim 1, wherein the mobile device is an APPLE iPHONE.

5. The method of claim 1, further comprising receiving an indication of different types of content to be retrieved and output.

6. The method of claim 5, wherein the indication of the different types of the content is specified by a user.

7. The method of claim 5, wherein the indication of the different types of the content is determined utilizing a user's past data access.

8. The method of claim 1, further comprising determining a current location of the mobile device.

9. The method of claim 8, wherein the current location of the mobile device is determined utilizing global positioning system (GPS) information received via a GPS system.

10. The method of claim 8, wherein the current location of the mobile device is determined utilizing a proximity of mobile communications towers.

11. The method of claim 8, wherein the preference information causes the mobile device to automatically receive local information based on the current location of the mobile device.

12. The method of claim 8, wherein the content is retrieved based on the current location of the mobile device.

13. The method of claim 8, wherein when the current location is different from a home location, the predetermined page includes information pertaining to the current location of the mobile device, without the user specifically requesting the information pertaining to the current location when requesting the predetermined page.

14. A computer program product comprising:

a non-transitory computer usable medium having computer usable program code embodied therewith, the computer usable program code comprising: computer usable program code configured to: receive, at a mobile device, preference information from a user; receive a request from the user for output of a predetermined page, including identifying a selection, by the user, of the predetermined page to be displayed by the mobile device; in response to the identifying of the selection, retrieve content via a wireless connection based on the preference information, the content including one or more news articles selected by a content provider based on the preference information; automatically design a layout of one or more objects associated with the retrieved content for display on the mobile device; and include the content retrieved in the predetermined page displayed by the mobile device, including outputting the retrieved content on the predetermined page of the mobile device.

15. The computer program product of claim 14, wherein the mobile device is a mobile telephone.

16. The computer program product of claim 14, wherein the content provider is GOOGLE.

17. The computer program product of claim 14, wherein the mobile device is an APPLE iPHONE.

18. The computer program product of claim 14, further comprising computer usable program code configured to receive an indication of different types of content to be retrieved and output.

19. The computer program product of claim 18, wherein the indication of the different types of the content is specified by a user.

20. A system, comprising:

a processor; and a computer usable medium, the computer usable medium having computer usable program code embodied therewith, which when executed by the processor causes the processor to:

receive, at a mobile device, preference information from a user;

receive a request from the user for output of a predetermined page, including identifying a selection, by the user, of the predetermined page to be displayed by the mobile device;

in response to the identifying of the selection, retrieve content via a wireless connection based on the preference information, the content including one or more news articles selected by a content provider based on the preference information;

automatically design a layout of one or more objects associated with the retrieved content for display on the mobile device; and include the content retrieved in the predetermined page displayed by the mobile device, including outputting the retrieved content on the predetermined page of the mobile device.

\* \* \* \* \*